United States Patent
Li et al.

(10) Patent No.: US 11,715,314 B2
(45) Date of Patent: Aug. 1, 2023

(54) PERFORMANCE IMPROVEMENT WITH OBJECT DETECTION FOR SOFTWARE BASED IMAGE PATH

(71) Applicant: Xerox Corporation, Norwalk, CT (US)

(72) Inventors: Xing Li, Webster, NY (US); Dhevendra Alagan Palanivel, Chennai (IN); Sainarayanan Gopalakrishnan, Medavakkam (IN); Rajasekar Kanagasabai, Medavakkam (IN)

(73) Assignee: XEROX CORPORATION, Norwalk, CT (US)

( * ) Notice: Subject to any disclaimer, the term of this patent is extended or adjusted under 35 U.S.C. 154(b) by 263 days.

(21) Appl. No.: 16/922,283

(22) Filed: Jul. 7, 2020

(65) Prior Publication Data

US 2022/0012483 A1     Jan. 13, 2022

(51) Int. Cl.
  *G06V 30/413*   (2022.01)
  *G06V 10/50*    (2022.01)
  *G06V 10/98*    (2022.01)

(52) U.S. Cl.
  CPC .......... *G06V 30/413* (2022.01); *G06V 10/50* (2022.01); *G06V 10/98* (2022.01)

(58) Field of Classification Search
  CPC ....... G06V 30/413; G06V 10/98; G06V 10/50
  See application file for complete search history.

(56) References Cited

U.S. PATENT DOCUMENTS

| | | | |
|---|---|---|---|
| 6,965,696 B1 * | 11/2005 | Tokuyama | G06V 30/413 358/448 |
| 7,058,222 B2 | 6/2006 | Li et al. | |
| 8,165,388 B2 | 4/2012 | Li et al. | |
| 2002/0057444 A1 * | 5/2002 | Ishikawa | G06T 5/20 358/1.9 |
| 2005/0271277 A1 * | 12/2005 | Lin | H04N 1/40062 382/173 |
| 2007/0058211 A1 * | 3/2007 | Kubota | H04N 1/40062 358/3.06 |
| 2008/0025637 A1 * | 1/2008 | Kashiwagi | G06V 30/1444 382/282 |
| 2009/0226082 A1 * | 9/2009 | Li | H04N 1/58 358/1.9 |

(Continued)

OTHER PUBLICATIONS

"Method to Improve Performance of Document Processing," Li et al., U.S. Appl. No. 16/441,601, filed Jun. 14, 2019.

*Primary Examiner* — Pinalben Patel
(74) *Attorney, Agent, or Firm* — Lippes Mathias LLP

(57) ABSTRACT

A computer-implemented method and system for processing a document page is based on text and non-text detections in an image path. An object block is generated for each image content identified within an input page. the blocks are extracted from the input document for downstream processing. Then, the object blocks are classified based on whether the content is text or non-text. The extracted non-text objects—which are specified by their bounding boxes—are processed separately from the rest of the content. The processing is performed on the text content blocks in parallel. However, when error diffusion is employed, the error diffusion is performed sequentially on the non-text content blocks to avoid stitching artifacts between individually error diffused patches in non-text areas.

14 Claims, 10 Drawing Sheets

(56) References Cited

U.S. PATENT DOCUMENTS

2012/0188612 A1\* 7/2012 Campanelli ............... G06T 5/20
  358/3.22
2014/0023270 A1\* 1/2014 Baheti .............. G06V 30/18076
  382/173

\* cited by examiner

PERFORMANCE IMPROVEMENT WITH OBJECT DETECTION FOR SOFTWARE BASED IMAGE PATH

BACKGROUND

The present disclosure relates to digital printing. It will be described with particular reference to a software-based image path of a xerographic, color scanning or other multifunction device. It will be appreciated, however, that the disclosure is also amendable to other like applications.

In image processing, the desire for high performance drives the development of systems that can perform operations over large amounts of data. For processing image data, software-based image paths provide the advantages of lower cost and flexibility over hardware-based image paths. A key challenge with a software-based image paths, however, is performance optimization. The complexity of these systems, and the size of images, demand substantial computational effort. This is because, for example, the processing is performed on every pixel in a document, page or image. Most pages in a print job have areas that require different amounts of processing. Any unnecessary processing prolongs the execution time for generating a final print job.

One way to improve performance is to employ multiple cores/GPUs to do parallel processing. The disclosure of co-pending and commonly owned U.S. Ser. No. 16/441,601 ("'601 disclosure"), entitled, "METHOD TO IMPROVE PERFORMANCE OF DOCUMENT PROCESSING", by Li et al., which is totally incorporated herein by reference, identifies an opportunity in parallel processing. The '601 disclosure reduces processing time by eliminating the operations performed on pixels that belong to white space. Its method employs an X-Y cut to extract image (non-white) image content from the white space. The different regions of image content are processed in parallel before they are reapplied to a blank canvas to generate the output page.

One step in processing the image content may involve error diffusion, which can cause stitching artifacts in the output page. Stitching is referred to as the reassembling of the different parts of the page back together. Artifacts may be visible at the boundaries of the parts that were separately rendered with error diffusion. While stitching artifacts are absent within the white space of the output page discussed supra, they may still be observed in the regions of image content.

There is desired an improved approach that eliminates and/or reduces stitching artifacts within the processed blocks, improves the quality of the final output, and reduces the time for executing a print job. The desired approach would make use of the image content that is extracted using the X-Y cut.

INCORPORATION BY REFERENCE

The disclosure of co-pending and commonly owned U.S. Ser. No. 16/441,601, entitled, "METHOD TO IMPROVE PERFORMANCE OF DOCUMENT PROCESSING", by Li et al., is totally incorporated herein by reference.

BRIEF DESCRIPTION

One embodiment of the present disclosure is directed to a computer-implemented method and system for processing a document page based on text and non-text detections within an image path. An object block is generated for each image content identified within an input page. The blocks are extracted from the input document for downstream processing. Then, the object blocks are classified based on whether the content is text or non-text. The extracted non-text content blocks—which are specified by their bounding boxes—are processed separately from the rest of the content. The processing is performed on the text content blocks in parallel. However, when error diffusion is employed, the error diffusion is performed sequentially on the non-text content blocks to avoid stitching artifacts between individually error diffused patches in non-text areas. The individually processed object blocks are then reapplied to a blank canvas to generate an output document. On the canvas, the blocks are separated by white space. The white space between the object blocks is absent stitching artifacts, and the non-text content in the output document is also absent stitching artifacts.

Another embodiment of the present disclosure is directed to a computer-implemented method and system for processing an image. Using a binary image that is generated from an input image, the image content that is surrounded by white space is identified. An object block is generated for each image content. The object blocks are then extracted from the input document. Each object block is classified as being one of text content and non-text content. This classification is performed by employing a statistical analysis. First, a pixel tile is identified for a given object block. Using the respective luminance $L^*$ of the pixels within a tile, an average luminance and standard deviation is computed across the pixel tile. The average luminance and the standard deviation are applied to a series of luminance thresholds. In response to the average luminance and the standard deviation meeting or exceeding the series of luminance thresholds, the pixel tile is classified as being a text content. A given object block is classified as a text content block if the number of text content tiles are below a predetermined threshold. After the object blocks are individually processed, they are reapplied to a blank canvas to generate an output document.

DETAILED DESCRIPTION

Figure 1:
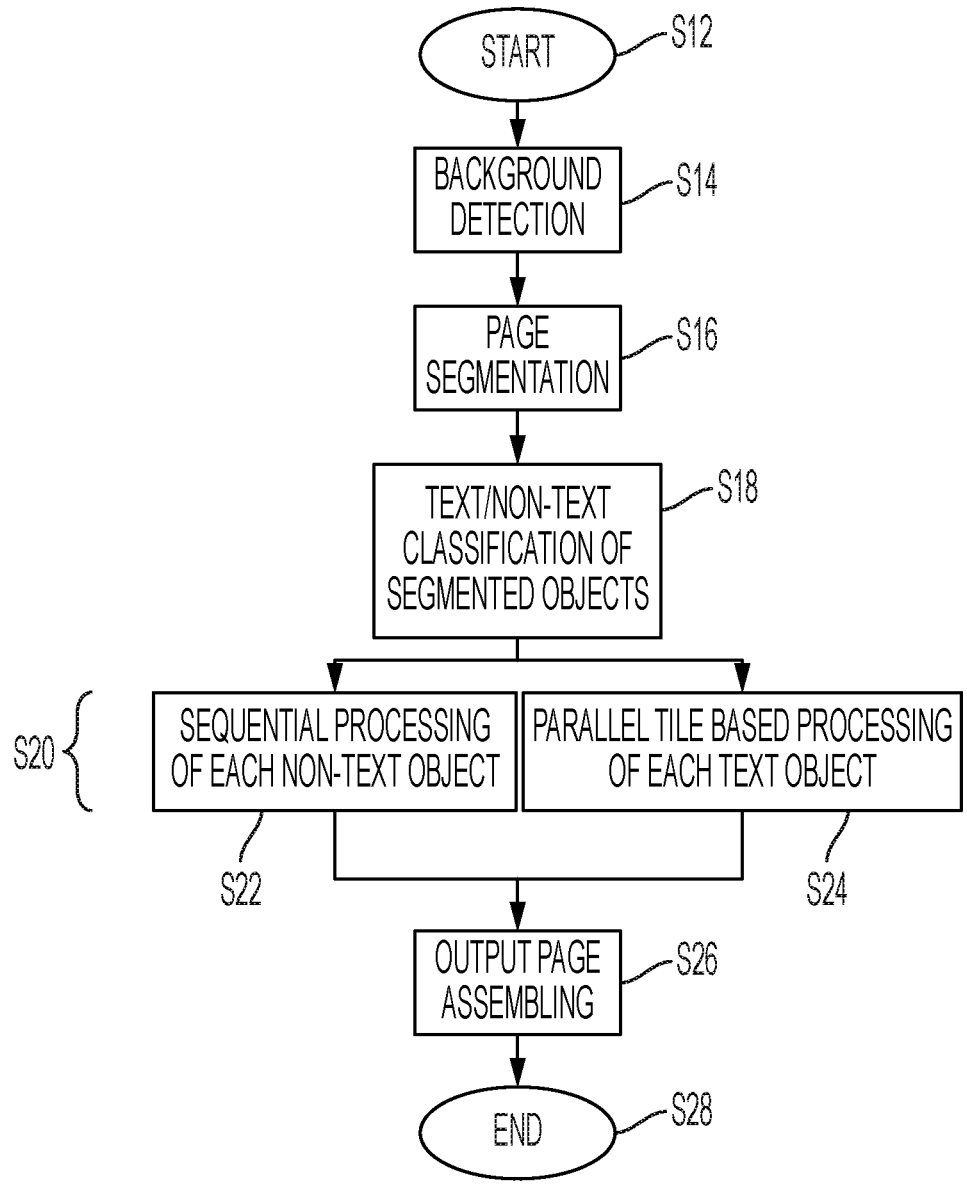
FIG. 1 is a flowchart showing an overview of the disclosed method for processing a document.

The present disclosure is directed to a system and method of processing image data for a document processing system. The method reduces noticeable stitching artifacts in printouts and electronic displays to improve overall print quality. FIG. 1 is an overview of a method 10 for processing a document page. The method starts at S12. In response to acquiring an input document at a document processing system, a background detection is performed on the document page at S14 to determine image objects in the page. Using background levels, pixels belonging to white space are identified and the remaining pixels are associated with image content. The image objects are separated from the rest of the content at S16. This is performed by generating a block for each region of image content that is surrounded by white space on the page. Each block is extracted from the document. Next, the segmented (i.e., extracted) objects undergo a thresholding operation to classify the image objects into categories such as text or non-text content. As used herein, the "text", "text object" or "text content" would include alphanumerical characters and line art and graphics while non-text content would include pictorial or photographed objects. While the original purpose of these page segmentation and object classification operations S16-S18 are for page editing or image quality optimization in conventional approaches, they are leveraged in the present disclosure to improve performance. At S20, downstream processing is performed on each block. The extracted non-text objects—which are specified by their bounding boxes—are processed separately from the rest of the content. The processing of the non-text objects and text objects can be done in parallel for many of the known operations. However, sequential error diffusion is applied for the non-text objects at S22 while parallel error diffusion is applied for the text objects at S24. This is based on the observation that while stitching artifacts of error diffusion are visible in pictorial/non-white background areas, they are not noticeable in text regions. In this way, the sequential processing is limited to only the blocks of non-text image content while parallel processing is performed on the pixels belonging to text content. The processed blocks are reapplied to the blank canvas at S26 to generate an output document page. The method ends at S28.

Figure 2:
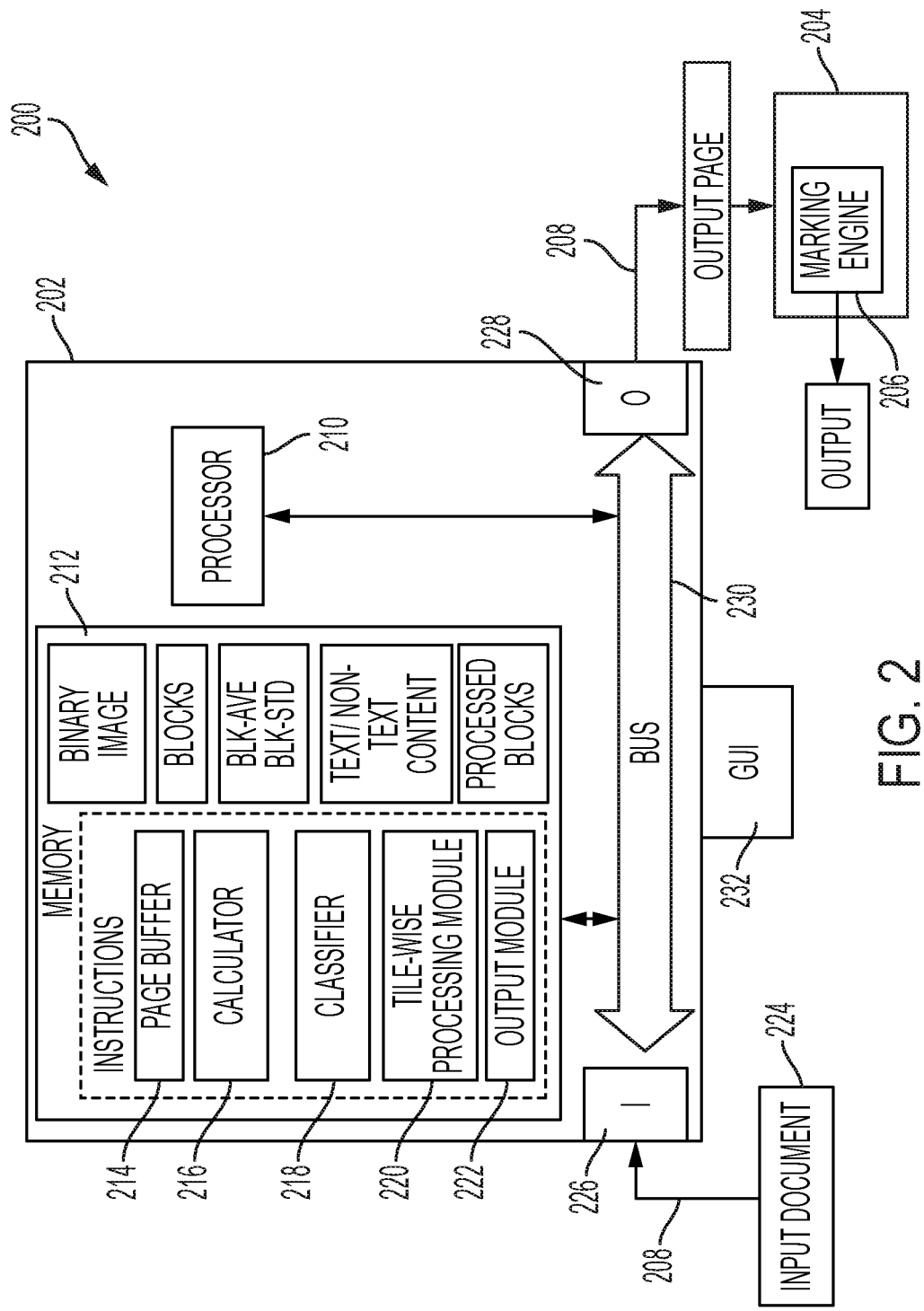
FIG. 2 is a schematic illustration of a system for generating a document according to one aspect of the exemplary embodiment.

FIG. 2 is a schematic illustration of a system 200 for generating a printed document according to one aspect of the exemplary embodiment. The system 200 may include a document processing system, hosted by a computing device 202 such as a digital front end ("DFE") or controller, and an image forming apparatus or printer device 204, including a marking engine or similar rendering device 206, which are linked together by communication links 208, referred to herein as a network. These components are described in greater detail below.

The computing device 202 illustrated in FIG. 2 includes a processor 210, which controls the overall operation by execution of processing instructions, which are stored in memory 212 connected to the processor 210.

The image processing operation disclosed herein is performed by the processor 210 according to the instructions stored in the memory 212. In particular, the memory 212 stores a page buffer 214; a color difference calculator 216; a classifier 218; a tile-wise processing module 220; and an output module 222. These modules 214-222 will be later described with reference to the exemplary method. In general, the modules 214-222 take an instruction and image data of an original input document 224, received as scanned or electronic input for rendering a printed document, and processes the document for improved handling at the device 204, particularly for improving both quality and computational loads when generating the output 232.

The computing device 202 includes one or more communication interfaces (I/O), such as network interfaces 226, 228 for communicating with external devices, such as printer device 204. The various hardware components 210, 212 (including random access memory "RAM") of the computing device 202 may all be connected by a bus 230.

With continued reference to FIG. 2, the computing device 202 is communicatively linked to a user interface device (GUI) 232 via a wired and/or wireless link. In various embodiments, the user interface device 232 may include one or more of a display device, for displaying information to users, and a user input device, such as a keyboard or touch or writable screen, for inputting instructions and/or receiving a visual display of the output, and/or a cursor control device, such as a mouse, trackball, or the like, for communicating user input information and command selections to the processor 210. Specifically, the user interface device 202 includes at least one of an input device and an output device, both of which include hardware, and which are communicatively linked with the computing device 202 via wired and/or wireless link(s).

As mentioned, the computing device 202 of the system 200 is communicatively linked with the printer 204 via link 208. While the computing device 202 may be linked to as few as one printer 204, in general, it can be linked to a fleet of printers. The exemplary printers 204 may each include the marking engine 206, which applies marking medium, such as ink or toner, to a substrate, such as paper, using, for example, a laser, inkjet, thermal, or other transfer process. The printer 204 renders images on print media, such as paper, and can be a copier, laser printer, bookmaking machine, facsimile machine, or a multifunction machine (which includes one or more functions such as scanning, printing, archiving, emailing, and faxing).

The memory 212 may represent any type of tangible computer readable medium such as random-access memory (RAM), read only memory (ROM), magnetic disk or tape, optical disk, flash memory, or holographic memory. In one embodiment, the memory 212 may each comprise a combination of random-access memory and read only memory. The digital processor 210 can be variously embodied, such as by a single-core processor, a dual-core processor (or more generally by a multiple-core processor), a digital processor and cooperating math coprocessor, a digital controller, or the like. The digital processors 210 in addition to controlling the operation of the computing device 202, executes instructions stored in the modules 214-222 for performing the parts of the method outlined below.

The software modules 214-222 as used herein, are intended to encompass any collection or set of instructions executable by the system 200 to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 226, 228 may include, for example, a modem, a router, a cable, and and/or Ethernet port, etc.

As will be appreciated, while computing device 202 and printer 204 are illustrated by way of example, the system 200 may be hosted by fewer or more linked computing devices. Each computing device may include, for example, a server computer, desktop, laptop, or tablet computer, smartphone or any other computing device capable of implementing the method described herein. Alternatively, the computing device 202 can be incorporated in the printer device 204.

Figure 3:
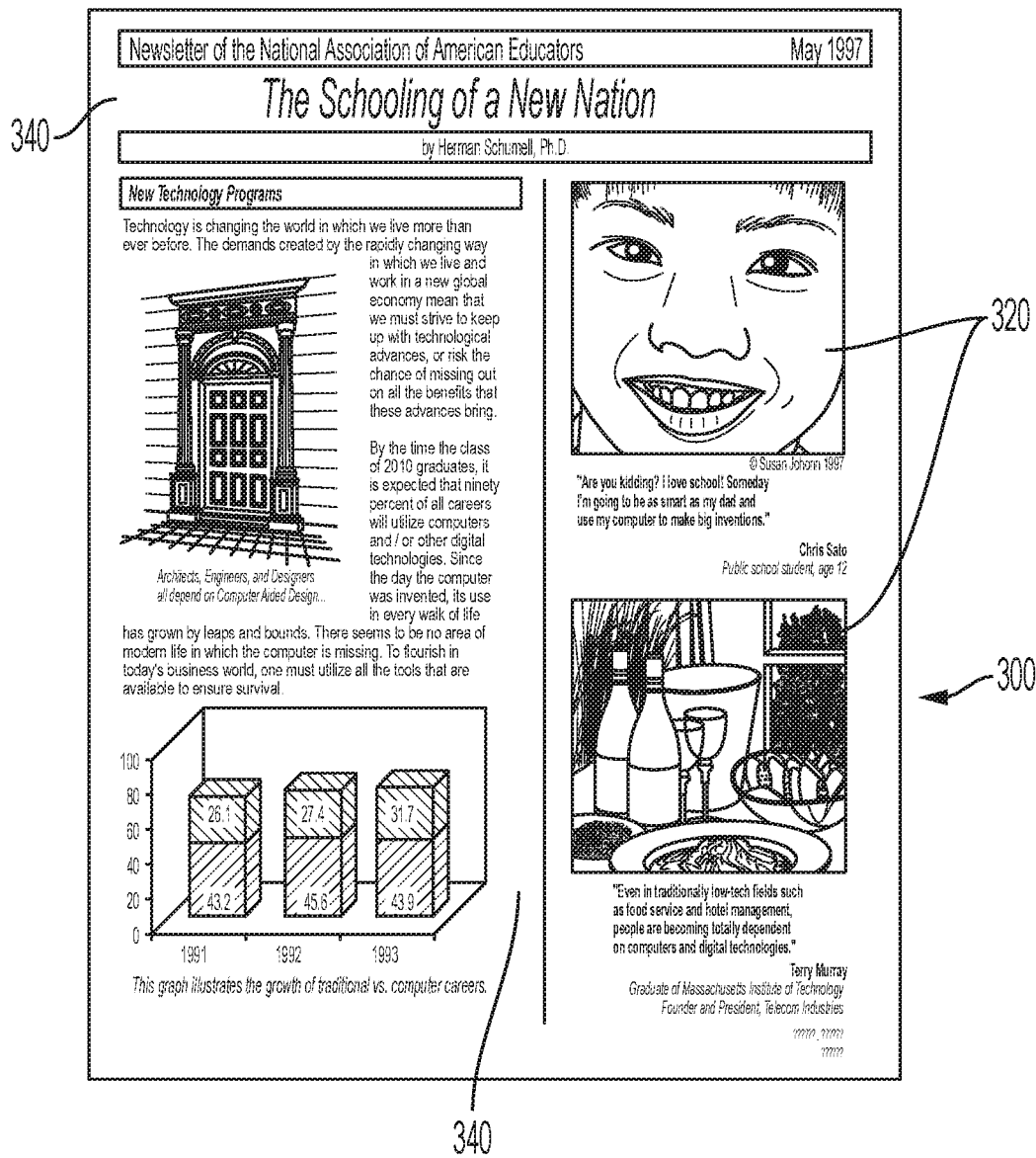
FIG. 3 is an original document page shown as a sample input for processing by the system of FIG. 2.

FIG. 3 shows an example of an original image (synonymously referred to as a page 300) including foreground content 320 against white space or background 340. The page 300 can be a single page print job or part of a multi-page document, whereby each page in the document can be processed in likewise manner. In the '601 disclosure, a method was disclosed for reducing print time by eliminating the processing operations performed on the pixels that belong to the white space 340 of the document page 320. In the '601 disclosure, the system determines a background level for the white space 340 of the input page 300. Using the background level, pixels are identified not belonging to the white space 340. The identified pixels are then used to generate a binary image, which is used to identify image content surrounded by the white space. A block is generated for each image content.

In the '601 disclosure, processing is performed on each block before the blocks are reapplied to the canvas. One processing step can include error diffusion. In conventional error diffusion, pixels are processed in linear fashion, where the difference between a given pixel's grayscale value and a threshold value is considered as error. To achieve the effect of continuous-tone illusion, the error is distributed to neighboring pixels that have not yet been processed. This sequence therefore complicates parallel error diffusion efforts, which can create a performance bottleneck. The step of error diffusion can cause artifacts to appear as discontinuities, deformations or misalignments.

Figure 4:
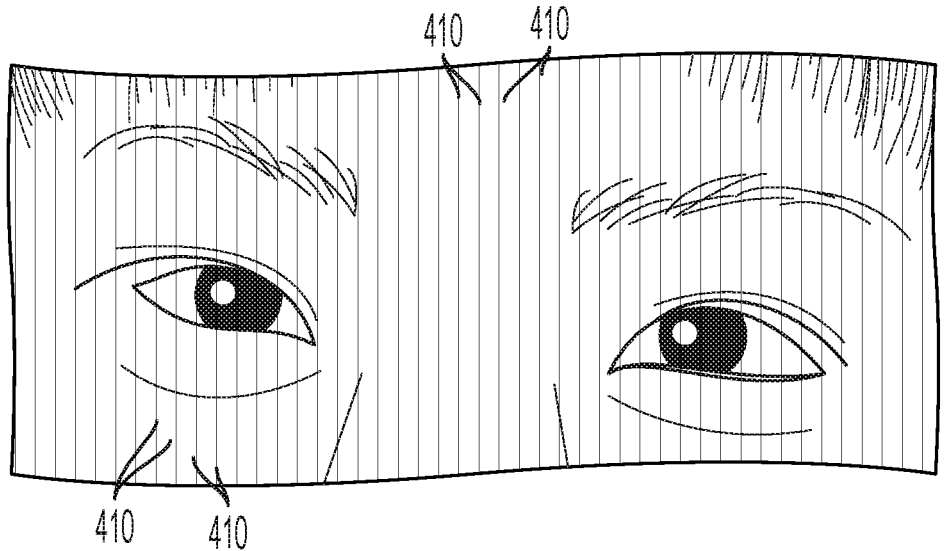
FIG. 4 illustrates a stitching artifact in the pictorial area that results from performing the conventional approach on the document of FIG. 3.
Figure 5:
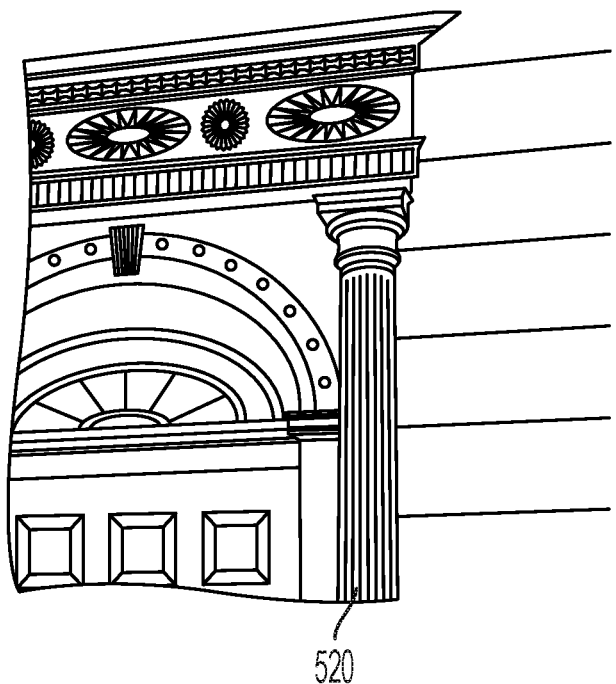
FIG. 5 illustrates the results in the text area from performing the conventional approach on the document of FIG. 3.

FIG. 4 illustrates a stitching artifact that results from performing conventional error diffusion on the non-text content block—that is, a pictorial area—of FIG. 3. The stitching artifacts are in the form of either a light of dark streak 410 down the printed content. While stitching artifacts of error diffusion are visible in pictorial content, they are not observed or noticeable in text regions. FIG. 5 illustrates the results from performing conventional error diffusion on text content blocks—that is, text—of FIG. 3. As illustrated in FIG. 5, there are no noticeable stitching artifacts in the line graphics 520 and the alphanumeric text 540 content.

The present disclosure introduces a new document image processing method aimed at performance improvement. Specifically, the present disclosure improves print quality while sparing the system of any unnecessary processing. It eliminates and/or reduces stitching artifacts that occur in the non-text regions while sparing the system of any unnecessary sequential processing in the text regions.

Figure 6A:
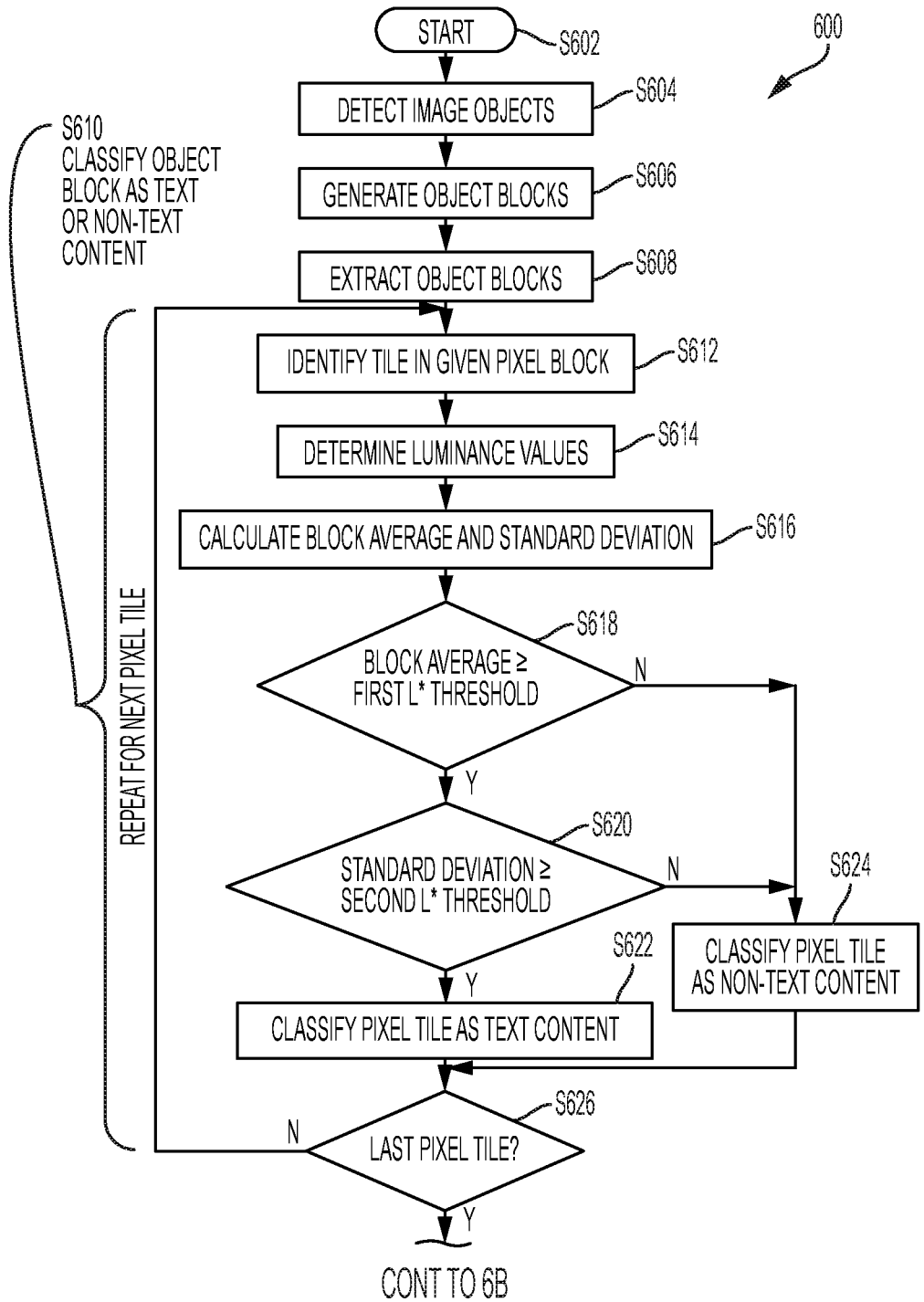
FIGS. 6A-6B are a flowchart showing a method for processing a document page according to one aspect of the exemplary embodiment.
Figure 6B:
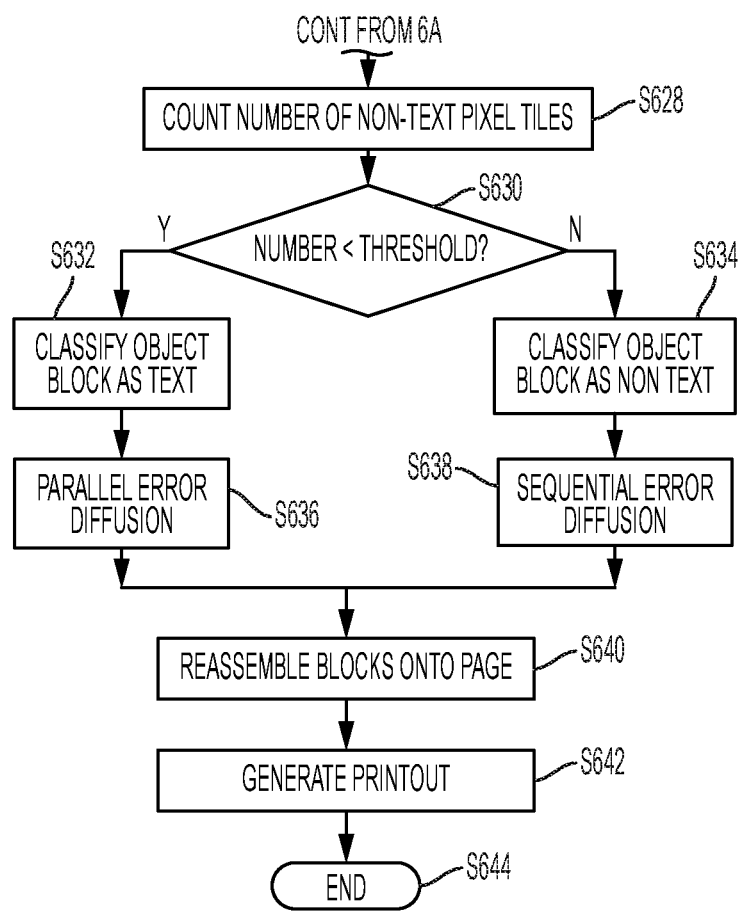

FIGS. 6A-6B are a flowchart showing a method 600 for processing a document page according to one aspect of the exemplary embodiment. The method starts at S602. In a first step, the image objects within the page are detected at S604. This detection can be performed according to the method set forth in the '601 disclosure or by any known approaches. In the illustrative example, a background detection and neutral pixel detection are employed to determine which pixels belong to the background canvas of the page. Mainly, the background detection operation determines the value of paper white—preferably by examining the full-page histogram. In an alternate embodiment, a background suppression operation can be employed through, for example, a gain and offset manipulation, after the background detection after which the background suppressed image is fed into the a page segmentation module.

In the illustrative embodiment, the detected paper white value or background level is used in page segmentation in the next step, which separates non-white page content from white background. Pixels belonging to the background are distinguished from those belonging to image objects (text and non-text content). A binary tag is generated for each pixel and the tags are used to generate a binary image of the original input document. The binary image is then used to identify the image content in the original image that is surrounded by white space.

Different arrangements are possible to capture object (i.e., non-white content) blocks. However, in the illustrative approach, a recursive X-Y cut is employed to decompose the page recursively into a set of rectangular blocks. This is the preferred approach because the preferred approach captures object blocks in rectangular bounding boxes. At S606, an X-Y cut algorithm is performed on the input page to generate the segmented blocks. Initially, horizontal and vertical projections are determined (by summing up all the pixels in a line). Then the image is segmented recursively into blocks by making cuts into the most prominent valley in the horizontal and vertical directions at each step. The cut is made when the length of the valley is greater than a threshold.

Therefore, object blocks are generated for each region of image content that is surrounded by white space in the input document. The blocks are created and defined by a bounding box around each set of connected components. The coordinates of each bounding box that contain the image content are determined, and the coordinate information is stored for later retrieval.

Figure 7:
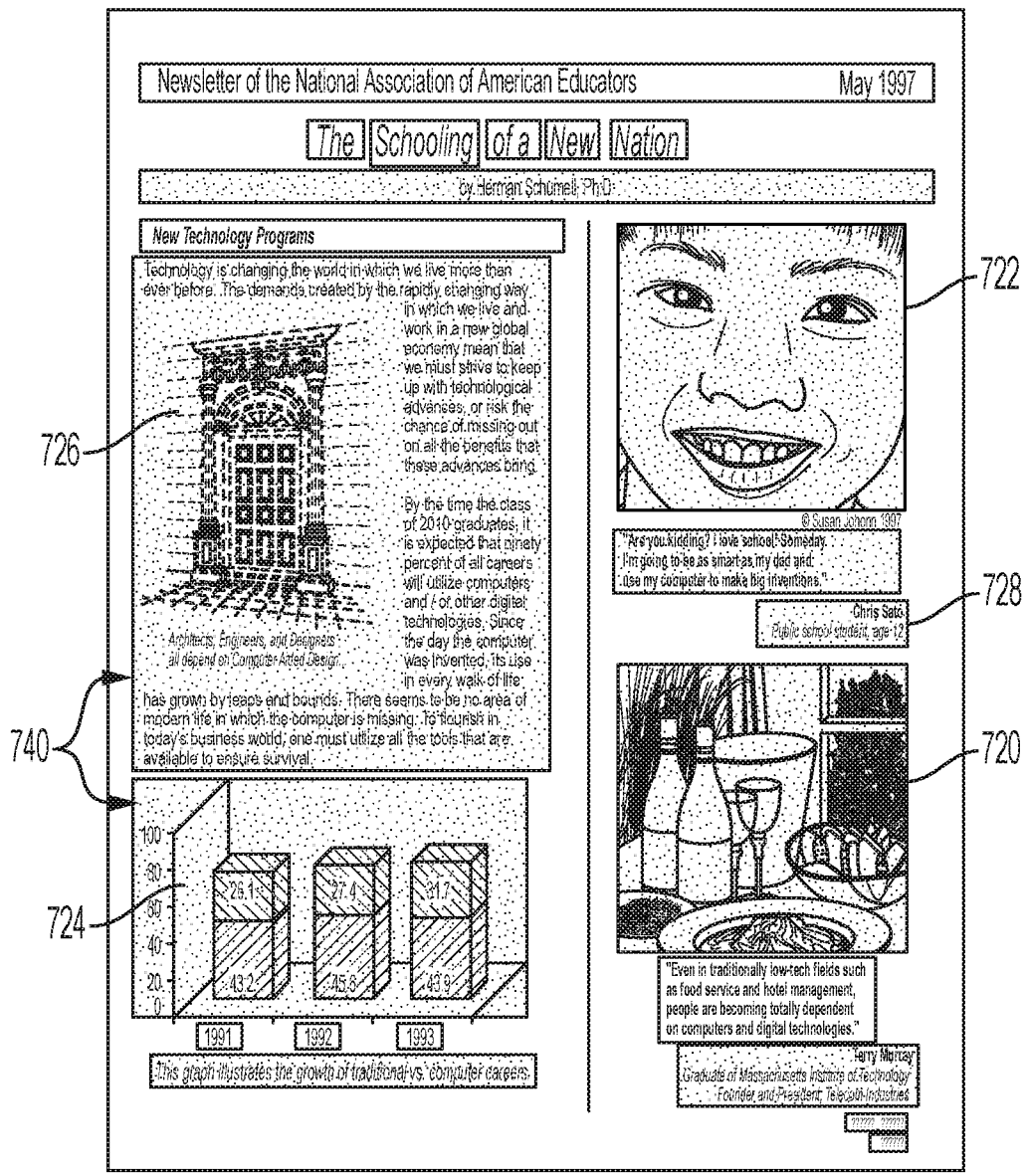
FIG. 7 is the page of FIG. 3 shown as segmented blocks resulting from the page segmentation in FIG. 6A.

FIG. 7 is the output generated from the XY-cut algorithm or page segmentation. FIG. 7 illustrates the numerous segmented blocks 720-728 detected from the input page of FIG. 3. Each block of image content is shown as a virtual bounding box 740. As FIG. 7 illustrates, the object blocks are not limited to any size. The object blocks 720-728 are shown various sizes as capturing the various sizes of image content. At S608, each object block is extracted from the input document for downstream processing. The bounding box information is employed to crop the bounded image content from the page. The cropping is performed by extracting the individual blocks, as separate blocks, from the page based on the blocks' respective coordinates. By extracting the bounded image content from the page, a blank canvas is generated.

After the page segmentation, the extracted image content (that is, the non-white object blocks) undergo a statistical analysis at S610 to classify each object block as belonging to text content and non-text content. For a given object block, a pixel tile is identified at S612. Each pixel in the tile as a respective luminance value L*. The luminance values L* of each pixel in the given tile are determined at S614. Using the luminance values for the tile, an average luminance and standard deviation is computed across the pixel tile at S616. The average and standard deviation are applied to a series of luminance thresholds to classify the blocks.

The average luminance for the pixel tile is applied to a first luminance threshold at S618. In the illustrative embodiment, the first (average) luminance threshold can be 160; however, there is no limitation made herein to the average luminance threshold. In response to the average luminance meeting or exceeding the first luminance threshold (YES at S618), the standard deviation for the pixel tile is applied to a second (standard deviation) luminance threshold at S620. In the illustrative embodiment, the second luminance threshold can be 60, but there is no limitation made herein to the value. The first and second thresholds are predetermined thresholds that the system acquires from storage or by user input.

In response to the standard deviation meeting or exceeding the second luminance threshold (YES at S620), the pixel tile is classified as being text content at S622. In response to either one of the average luminance and standard deviation not meeting the first or second luminance thresholds (NO at S618 or S620), the pixel tile is classified as being non-text content at S624. Steps S618 and S620 are not required to be performed in this specific order. In another embodiment, the thresholding operation can be performed in reverse sequence or in parallel.

The steps S612-S624 are repeated for remaining pixels in the pixel tile. Then, a determination is made whether all the pixels in the pixel tile have been processed at S626. If all the pixels have been processed (YES at S626), the number of pixel tiles that were classified as the text content (at S622) are counted at S628. The number of pixel tiles are then applied to a predetermined threshold at S630. In response to the number of pixel tiles being less than a predetermined threshold (YES at S630), the object block is classified as being a text content block at S632. In response to the number of pixel tiles meeting or exceeding the predetermined threshold (NO at S630), the object block is classified as being a non-text content block at S634. In the illustrative embodiment, the predetermined threshold is 10% of the total number of pixel tiles in the given object block. If the object block contains enough non-text tiles (e.g., greater than 10%), then it is classified as non-text object. Otherwise, the object block is classified as text content.

There is no limitation made herein to the value set for the predetermined threshold, and it can vary based on the number of pixel tiles in each block. There is furthermore no limitation made herein to the number of tiles in a given block, but a representative example can include 32×32 tiles.

Figure 8:
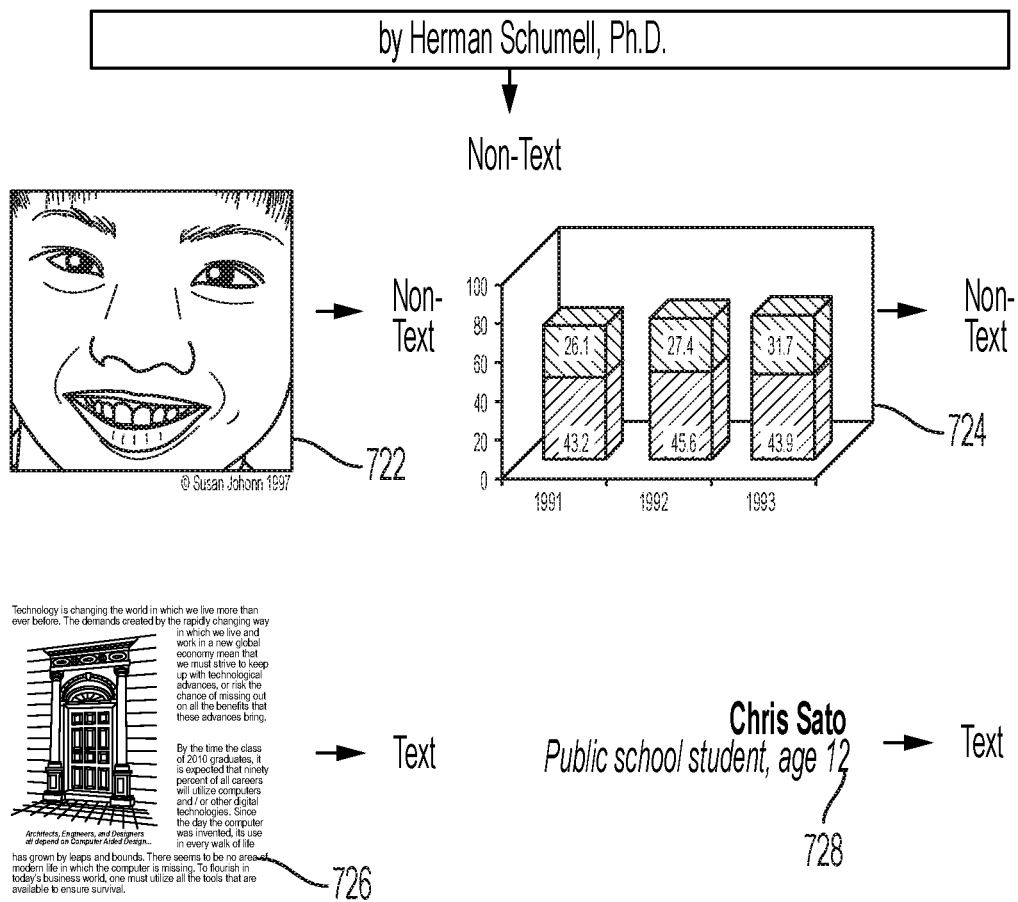
FIG. 8 shows illustrative classifications during the processing step in the method of FIGS. 6A-6B.

FIG. 8 shows sample results of the classification of some of the segmented object blocks 722-728. The statistical analysis performed on blocks 724, 724 (shown in FIG. 7) results in a non-text classification while the statistical analysis performed on blocks 726, 728 results in a text classification.

Figure 9:
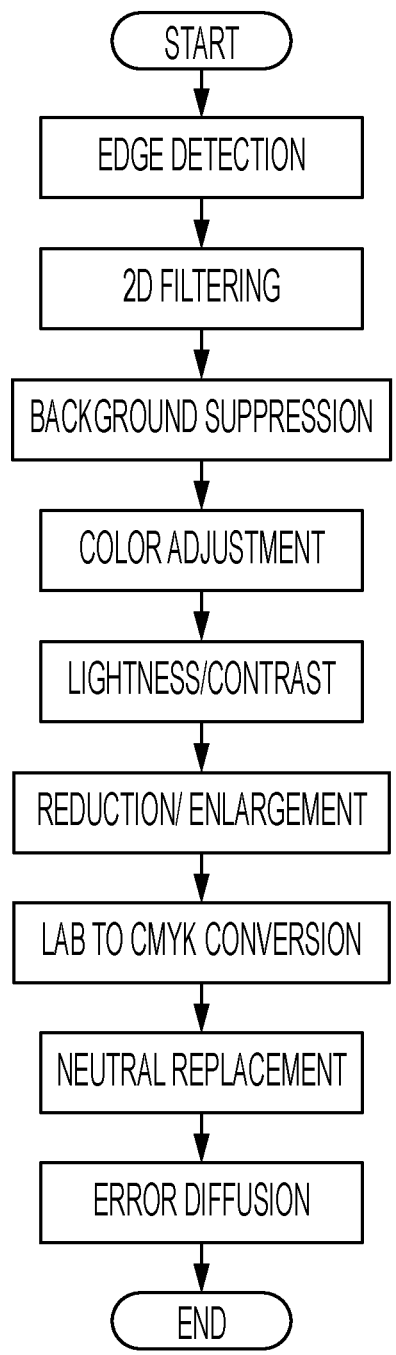
FIG. 9 is a flow chart showing a series of operations that can be performed on the document page.

Next, the object blocks are processed. Turning to FIG. 9, a series of operations performed on a block of image content is shown. The processing is performed in parallel on the extracted block of image content. Therefore, the processing is limited to only the blocks of image content while no processing is performed on the pixels belonging to the white space. There is no limitation made herein to the exact operations or to the sequence; each operation may be optionally performed on a block and may be performed in the illustrative sequence or in a different sequence.

The present disclosure allows for the processing method of FIG. 9 to be performed simultaneously on multiple blocks, including the step of error diffusion. One aspect of the present disclosure is that it allows for the extracted non-text objects—which are specified by their bounding boxes—to be processed separately from the rest of the content. The processing is performed on the text content blocks in parallel at S636, including the step or operation of error diffusion. This is because there are no noticeable stitching artifacts between individually error diffused patches in text areas—no matter where the tile boundaries are located. The processing can be performed on the non-text content blocks in parallel too. However, when error diffusion is employed, the it is performed sequentially on the non-text content blocks at S638.

In other words, sequential error diffusion is applied for non-text content objects while parallel error diffusion can be applied for text content objects. When performed in parallel, the error diffusion is applied on multiple bands or tiles.

Returning to FIG. 6B, once the bounding boxes are individually processed, the system 200 reassembles the blocks back on the page at S640 to generate an output document. In one embodiment, the individually processed blocks are reapplied or pasted onto the blank canvas using the stored coordinates associated with each extracted blocks.

Figure 10:
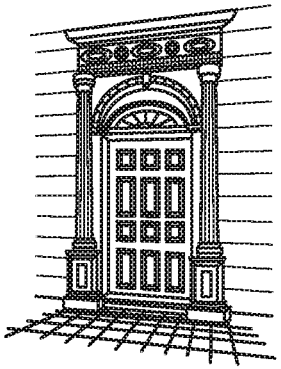
FIG. 10 shows a final page as a sample output of the page in FIG. 3 after undergoing the document processing disclosed in the exemplary embodiment.

FIG. 10 shows a final page as a sample output after undergoing the method disclosed in the exemplary embodiment. The output document is then transmitted to a display device or a printer device for generating a printed document at S642.

As illustrated in FIG. 10, the processed object blocks that are reapplied to the blank canvas are separated by white space. While stitching artifacts are absent in the white space between the object blocks in a printed document, they are also absent in the text and non-text content regions. The method ends at S644.

One aspect of the present disclosure is an improved processing of document pages that contain mixed text and non-text content. The non-text content can be detected within the document page and processed separately using sequential error diffusion to avoid stitching artifacts.

While the present disclosure employs an X-Y cut to implement the content analysis, which the parallel and sequential processing are based on, there is no limitation made herein to the technique that is employed. For example, in an alternative embodiment, the object detection can be performed via a connected component analysis. In additional embodiments, the objects can be classified into various categories, such as pictorial, graphical, text, etc., through other forms of analysis.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for processing a document image including white page content and non-white page content, the method comprising:
   at a server computer:
   performing page segmentation of an input document to generate an object block for each non-white image content identified in the input document, each of the object blocks surrounded by only white space content;
   extracting the object blocks from the input document;

classifying each object block as being one of text content and non-text content;
processing the non-text content separately from the text content, the processing including:
performing parallel error diffusion on the text content blocks, wherein error diffusion includes processing text content block pixels to determine an error defined as a difference between a pixel's gray scale value and a threshold value, and distributing the error to neighboring pixels to achieve a continuous tone effect, the error diffusion process performed in parallel on multiple text content blocks; and
performing sequential error diffusion on the non-text content blocks, wherein error diffusion includes processing non-text content block pixels to determine the error defined as a difference between a pixel's gray scale value and a threshold value, and distributing the error to neighboring pixels to achieve a continuous tone effect, the error diffusion process performed sequentially on multiple text content blocks;
reapplying the processed object blocks to a blank canvas to generate an output document; and
transmitting the output document to a display device in communication with the server computer;
wherein the processed object blocks reapplied to the blank canvas are separated by white space; wherein the white space between the object blocks on the canvas is absent stitching artifacts associated with discontinuities, deformations or misalignments of neighboring object blocks; and wherein the non-text content in the processed object blocks is absent stitching artifacts associated with discontinuities, deformations or misalignments of neighboring object blocks.

2. A system comprising a non-transitory storage device having stored thereon instructions for implementing the method of claim 1.

3. A computer-implemented method for processing a document, the method comprising:
at a server computer:
using a binary image, identifying image content surrounded by white space in an input document;
generating an object block for each image content;
extracting each object block from the input document;
classifying each object block as being one of text content and non-text content, the classifying including:
(a) identifying a pixel tile for a given object block, each pixel in the pixel tile having a respective luminance L* value;
(b) computing an average luminance L* value and standard deviation of L* values across the pixel tile;
(c) comparing the average luminance L* value and the standard deviation L* value to respective luminance threshold values;
(d) in response to the average luminance L* value and the standard deviation L* values exceeding the respective luminance threshold values, classifying the pixel tile as being a text content pixel tile, otherwise classify the pixel tile as being a non-text content pixel tile;
(e) repeating steps (a)-(d) for remaining pixel tiles in the object block;
counting a number of pixel tiles classified as non-text content pixel tiles in the object block;
in response to the number being less than a predetermined threshold value, classifying the object block as being a text content block, otherwise classifying the object block as being a non-text content block;
processing the object blocks, including:
sequentially processing the pixel tiles of the non-text content blocks, and parallel processing the pixel tiles of the text content blocks, wherein the processing includes performing parallel error diffusion on the text content blocks, wherein error diffusion includes processing text content block pixels to determine an error defined as a difference between a pixel's gray scale value and a threshold value, and distributing the error to neighboring pixels to achieve a continuous tone effect, the error diffusion process performed in parallel on multiple text content blocks; and
performing sequential error diffusion on the non-text content blocks, wherein error diffusion includes processing non-text content block pixels to determine the error defined as a difference between a pixel's gray scale value and a threshold value, and distributing the error to neighboring pixels to achieve a continuous tone effect, the error diffusion process performed sequentially on multiple text content blocks;
reapplying the processed object blocks to a blank canvas to generate an output document; and
transmitting the output document to a display device in communication with the server computer.

4. The method of claim 3, wherein the predetermined threshold value is 10% of the total number of pixel tiles in a given object block.

5. The method of claim 3, wherein in response to the number of non-text pixel tiles meeting or exceeding the predetermined threshold value, classifying the object block as being non-text content block.

6. The method of claim 3, wherein the average luminance L* threshold value is 160.

7. The method of claim 3, wherein the standard deviation luminance L* threshold value is 60.

8. The method of claim 3, wherein the text content includes text, line art or graphics.

9. A system for detecting text and non-text objects in an image path, the system comprising:
a non-transitory storage device having stored thereon instructions for:
using a binary image, identifying image content surrounded by white space in an input document;
generating an object block for each image content;
extracting each object block from the input document;
classifying each object block as being one of text content and non-text content, the classifying including:
(a) identifying a pixel tile for a given object block, each pixel in the pixel tile having a respective luminance L* value;
(b) computing an average luminance L* value and standard deviation of L* value across the pixel tile;
(c) comparing the average luminance L* value and the standard deviation L* value to respective luminance threshold values;

(d) in response to the average luminance L* value and the standard deviation L* values exceeding the respective luminance threshold values, classifying the pixel tile as being a text content pixel tile, otherwise classify the pixel tile as being a non-text content pixel tile;

(e) repeating steps (a)-(d) for remaining pixel tiles in the object block;

counting a number of pixel tiles classified as non-text content pixel tiles in the object block;

in response to the number being less than a predetermined threshold value, classifying the object block as being a text content block, otherwise classifying the object block as being a non-text content block;

processing the object blocks including:

sequentially processing the pixel tiles of the non-text content blocks, and parallel processing the pixel tiles of the text content blocks, wherein the processing includes performing parallel error diffusion on the text content blocks, wherein error diffusion includes processing text content block pixels to determine an error defined as a difference between a pixel's gray scale value and a threshold value, and distributing the error to neighboring pixels to achieve a continuous tone effect, the error diffusion process performed in parallel on multiple text content blocks; and performing sequential error diffusion on the non-text content blocks, wherein error diffusion includes processing non-text content block pixels to determine the error defined as a difference between a pixel's gray scale value and a threshold value, and distributing the error to neighboring pixels to achieve a continuous tone effect, the error diffusion process performed sequentially on multiple text content blocks; and reapplying the processed object blocks to a blank canvas to generate an output document;

at least one hardware processor being part of a computing device and configured to execute the instructions; and a display device in communication with the computing device, the display device for displaying the output.

10. The system of claim 9, wherein the predetermined threshold value is 10% of the total number of pixel tiles in the given object block.

11. The system of claim 9, wherein the processor is further operative to:

in response to the number of non-text pixel tiles meeting or exceeding the predetermined threshold value, classify the object block as being non-text content block.

12. The system of claim 9, wherein the average luminance L* threshold value is 160 and the standard deviation luminance L* threshold value is 60.

13. The system of claim 9, wherein the text content includes text, line art or graphics.

14. The system of claim 9, wherein the processed object blocks reapplied to the blank canvas are separated by white space; wherein the white space between object blocks is absent stitching artifacts associated with discontinuities, deformations or misalignments of neighboring object blocks; and wherein the non-text content in the processed object blocks is absent stitching artifacts associated with discontinuities, deformations or misalignments of neighboring object blocks.

* * * * *